(12) United States Patent
Doughty (10) Patent No.: US 7,592,727 B1
(45) Date of Patent: Sep. 22, 2009

(54) QUIET LOAD FOR MOTOR TESTING

(75) Inventor: Samuel P. S. Doughty, Mount Ephraim, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 799 days.

(21) Appl. No.: 11/194,831

(22) Filed: Aug. 1, 2005

(51) Int. Cl.
*H02K 49/02* (2006.01)
(52) U.S. Cl. ..................................... 310/105
(58) Field of Classification Search ............... 310/105, 310/107, 109, 36, 114, 115, 165
See application file for complete search history.

(56) References Cited

U.S. PATENT DOCUMENTS

| | | | |
|---|---|---|---|
| 4,235,316 A * | 11/1980 | Blomberg ............... | 188/181 R |
| 4,744,041 A | 5/1988 | Strunk et al. | |
| 4,888,996 A | 12/1989 | Rak et al. | |
| 4,922,172 A | 5/1990 | Roddy et al. | |
| 4,965,513 A | 10/1990 | Haynes et al. | |
| 4,996,477 A | 2/1991 | Keeler et al. | |
| 5,061,890 A | 10/1991 | Longini | |
| 5,461,329 A | 10/1995 | Linehan et al. | |
| 5,581,178 A | 12/1996 | Richter et al. | |
| 5,623,104 A | 4/1997 | Suga | |
| 5,811,668 A | 9/1998 | Kondoh et al. | |
| 5,811,947 A | 9/1998 | Hurst et al. | |
| 6,005,361 A | 12/1999 | Grinewitschus et al. | |
| 6,006,611 A | 12/1999 | Galvin et al. | |
| 6,144,179 A | 11/2000 | Kessler et al. | |
| 6,236,175 B1 | 5/2001 | Mourad et al. | |
| 6,286,637 B1 * | 9/2001 | Park et al. ................... | 188/158 |
| 6,345,542 B1 | 2/2002 | Suzuki et al. | |
| 6,577,137 B1 | 6/2003 | Fisher | |
| 6,591,200 B1 | 7/2003 | Cohen et al. | |
| 6,614,256 B2 | 9/2003 | Bonduel et al. | |
| 6,686,761 B2 | 2/2004 | Pan et al. | |
| 6,738,718 B2 | 5/2004 | Kurnia et al. | |
| 6,789,023 B2 | 9/2004 | Tsai et al. | |
| 6,810,341 B2 | 10/2004 | Qian et al. | |
| 6,837,099 B2 | 1/2005 | Kim et al. | |
| 6,839,653 B2 | 1/2005 | Gerlach | |
| 6,895,809 B2 | 5/2005 | Raichle | |

* cited by examiner

*Primary Examiner*—Javaid Nasri
(74) *Attorney, Agent, or Firm*—Howard Kaiser (57) ABSTRACT

A device for imposing a torque load upon rotating machinery comprises a rotary unit and plural electromagnetic units. The rotary unit includes a shaft and conductive disks discretely fastened thereto. Each electromagnetic unit includes a bracket-shaped magnetic core and one or more ferromagnetic pieces discretely fastened thereto. The device's shaft is joined end-to-end to the motor's shaft, permitting integral axial rotation of the device's shaft, the disks and the motor's shaft. Each electromagnetic unit is placed so that the core "brackets" the two extreme disks, while each piece is between two disks. During rotation, a wire (coiled around each core) conducts current of selected amperage so as to generate a magnetic field of sufficient intensity that a magnetic flux circuit is formed through the stationary core and pieces and the rotating disks, resulting in a Lorentz force associated with the magnetic field and eddy currents engendered in the disks.

12 Claims, 6 Drawing Sheets

QUIET LOAD FOR MOTOR TESTING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to machines (e.g., motors) that include rotational members, more particularly to methods and apparatuses for imposing torque loading upon a rotational member for purposes of conducting testing (such as involving vibration, e.g., acoustic vibration) of a machine.

Vibration, such as sound vibration (e.g., that which produces noise), is an important consideration in the operation of various types of machinery. The current methodologies for providing a torque load for vibration testing of machines such as motors are deficient in terms of induced load smoothness, heat generation and vibration generation. The devices conventionally used for motor testing include Prony brakes, water brakes, generator loads, and magnetic rheological devices.

It is desirable that a "quiet load" be used for vibration testing of a "quiet motor" so as to minimize or avoid contribution of vibration by the load to the overall vibration that is being measured with attribution to the motor. When a quiet motor is to be tested (e.g., for an endurance test), it is unsuitable to use a noisy load for testing, as such would represent an abnormal operating condition for the motor. A quiet motor is designed to operate quietly, in a quiet environment, and the introduction of a noisy test component would be incongruous. A "quiet motor," as the term is used herein, is a motor that is designed to generate a relatively low amount of vibration during operation of the motor. A "quiet load," as the term is used herein, is an induced load that generates as little vibration as possible at all frequencies (or all significant frequencies) during induction of the load with respect to the motor during testing (e.g., vibration testing) of the motor. It is further desirable that the load be able to operate over wide ranges of speed and torque.

SUMMARY OF THE INVENTION

In view of the foregoing, it is an object of the present invention to provide a methodology for imparting a torque load in such a way that such imparting does not compromise the accuracy of testing (e.g., vibration testing) of a machine such as a motor.

It is a further object of the present invention to provide such a methodology that is characterized by, or admits of, range versatility regarding speed and torque.

According to typical inventive practice, an axle is fastened to a rotor of a test machine so that the axle and rotor share the same axis of rotation. The axle has fastened thereto one or more electrically conductive wheels. A magnetic field and an associated magnetic circuit are electromagnetically produced, the magnetic circuit intersecting each electrically conductive wheel. When the rotor is caused to rotate, electrical eddy currents occur in each electrically conductive wheel. A Lorentz force, associated with the combination of the magnetic field and the electrical eddy currents, exerts a counter-rotational influence on the rotor.

The present invention is useful in the vibration testing of machines such as motors, particularly those that are designed to be characterized by relative quietness, viz., quiet motors. The present invention's methodology is practicable for acoustic testing or for various other testing purposes. The present invention provides a load without inducing any vibration that is not otherwise present. Featured by the present invention is the novel application of a non-contact, electromagnetic torque load to test electric motors. The inventive device's torque load uniquely describes an "eddy current quiet load" for a motor (e.g., quiet motor), wherein the scientific principle underlying the present invention bears some similarity to the scientific principle underlying a magnetic damper. The non-contact nature of the inventively applied load avoids (or substantially avoids) the introduction of vibration into the test. According to typical inventive practice, the applied torque load is variably controlled.

Among the advantages afforded by the present invention are the following: smoothness of the applied torque load; quietness of the applied torque load; elimination (or substantial reduction) of introduction of vibration, by the torque load, into the machine being tested; precision of variable control of the torque load; directional independence (e.g., reversibility) of variable control of the torque load. As compared with conventional devices, the inventive device is much smoother with respect to the torque load that can be applied to the motor being tested. The present invention's quiet load generates only steady torques, generating no forces on the test machine rotor, and generating no torques or forces on the test machine frame.

In accordance with typical embodiments of the present invention, an inventive device comprises a rotating assembly and at least one stationary electromagnetic structure. More typically, at least two stationary electromagnetic structures are included. The rotating assembly includes a rigid shaft and at least two electrically conductive disks that are separated from and parallel to each other and that are perpendicular to the shaft, each electrically conductive disk being concentrically and fixedly attached to the shaft so as to be rotatable commensurately with the shaft. A housing is provided for the stationary electromagnetic structures. Each stationary electromagnetic structure includes a square-bracket-shaped ("["-shaped or "]"-shaped) core member and at least one wedge-shaped guidance member, wherein the number of wedge-shaped guidance members is one less than the number of electrically conductive disks. Each bracket-shaped ("["-shaped or "]"-shaped) core member is conceptually divisible into a vertical segment-shaped ("I"-shaped) main core section and two protrusive end core sections, each horizontal segment-shaped ("-"-shaped). In each stationary electromagnetic structure, each wedge-shaped guidance member is fixedly attached to the main core section of the bracket-shaped core member.

The stationary electromagnetic structures are positioned generally surroundingly (and generally symmetrically, according to frequent inventive practice) with respect to the rotating assembly so that, in each stationary electromagnetic structure: the main core section of the bracket-shaped core member, in longitudinal orientation, is parallel to the shaft and perpendicular to the electrically conductive disks; each of the two protrusive end core sections of the bracket-shaped core member, in longitudinal orientation, is perpendicular to the shaft and parallel to the electrically conductive disks; each of the two protrusive end core sections of the bracket-shaped core member is radially disposed with respect to the geometric rotational axis of the shaft; each wedge-shaped guidance member is radially disposed, with outwardly increasing thickness, with respect to the geometric rotational axis of the shaft; the main core section of the bracket-shaped member is situated near the rims of the electrically conductive disks; each of the two protrusive end core sections of the bracket-shaped core member is situated next to the outward faces of the two longitudinally extreme electrically conductive disks; each wedge-shaped guidance member is closely interposed between two adjacent electrically conductive disks.

For purposes of testing a motor, the inventive device's shaft is coaxially and fixedly attached to the motor's rigid shaft, the inventive device's shaft and the motor's shaft thereby effectively constituting a single rigid shaft having a single geometric axis of rotation. An electrical winding for conducting direct current is wound (coiled) about the main core section of the bracket-shaped core member. When the motor's shaft (and hence the inventive device's shaft) is motivatively energized, and electrical current is caused to flow through the electrical winding, a closed magnetic flux path is disposed through the bracket-shaped core, the wedge-shaped guidance block(s), and the rotating electrically conductive disks; that is, the magnetic flux flows, in a closed loop, through the stationary electromagnetic structure and through the conductive disks. As a result of the magnetic circuit established by the completely closed magnetic flux path, electrical eddy currents develop in the electrically conductive disks. The eddy currents arise due to the rotation of the electrically conductive disks in combination with the intersection of the electrically conductive disks by the magnetic flux path. The inventive device's shaft (and hence the motor's shaft) develops a resistive torque load corresponding to the generation of Lorentz forces that are associated with the physical interaction of (a) the electrical eddy currents generated in the disks and (b) the magnetic field emanating from the combination of the electrical winding and the main core section, about which the electrically winding is wound, of the electromagnetic core's bracket-shaped core member.

Other objects, advantages and features of the present invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
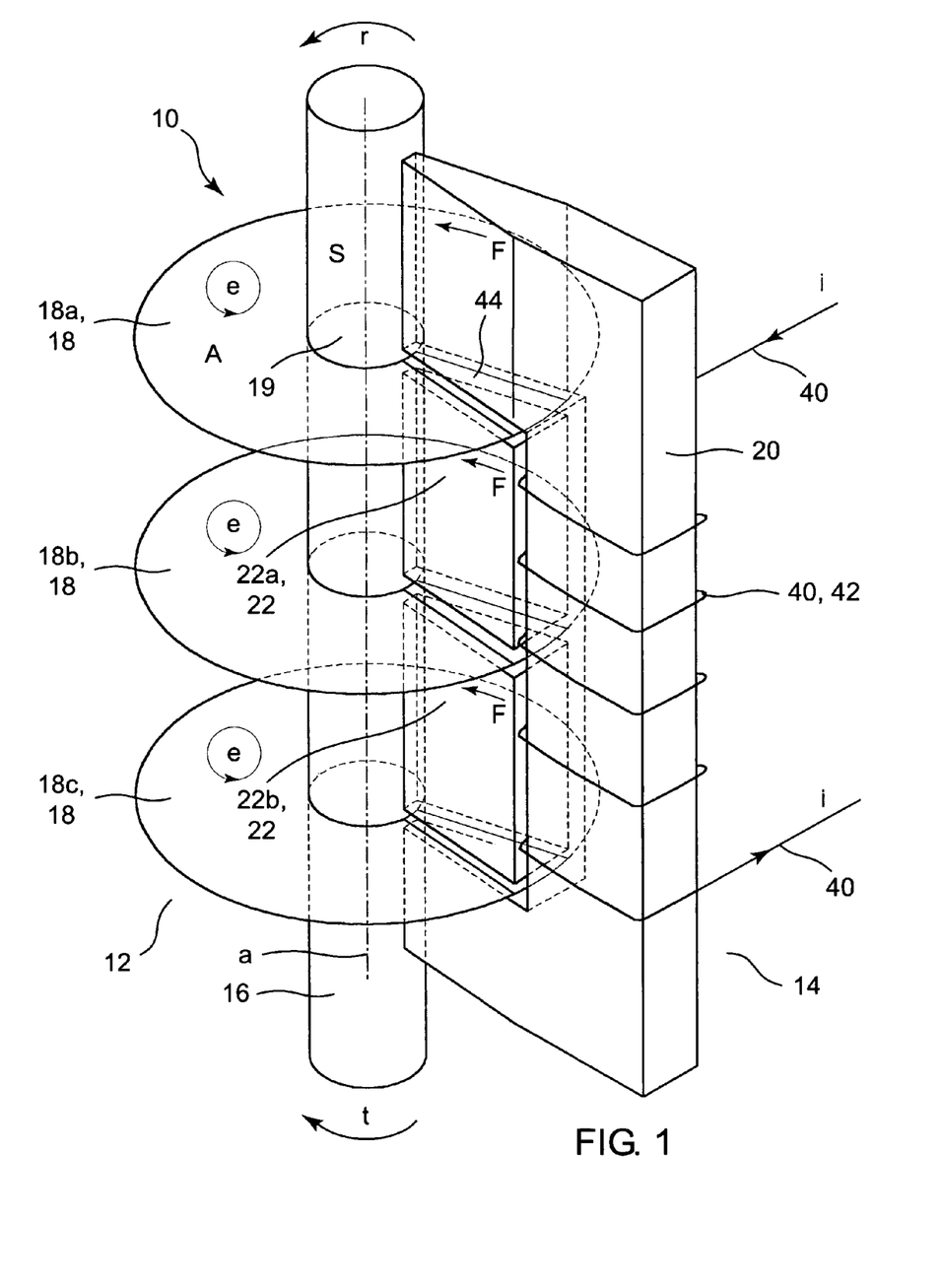
FIG. 1 is a diagrammatic perspective view of an embodiment of a torque load imposition device in accordance with the present invention, particularly illustrating the configuration and operation of the device's shaft, disks, core, winding and guide blocks.
Figure 2:
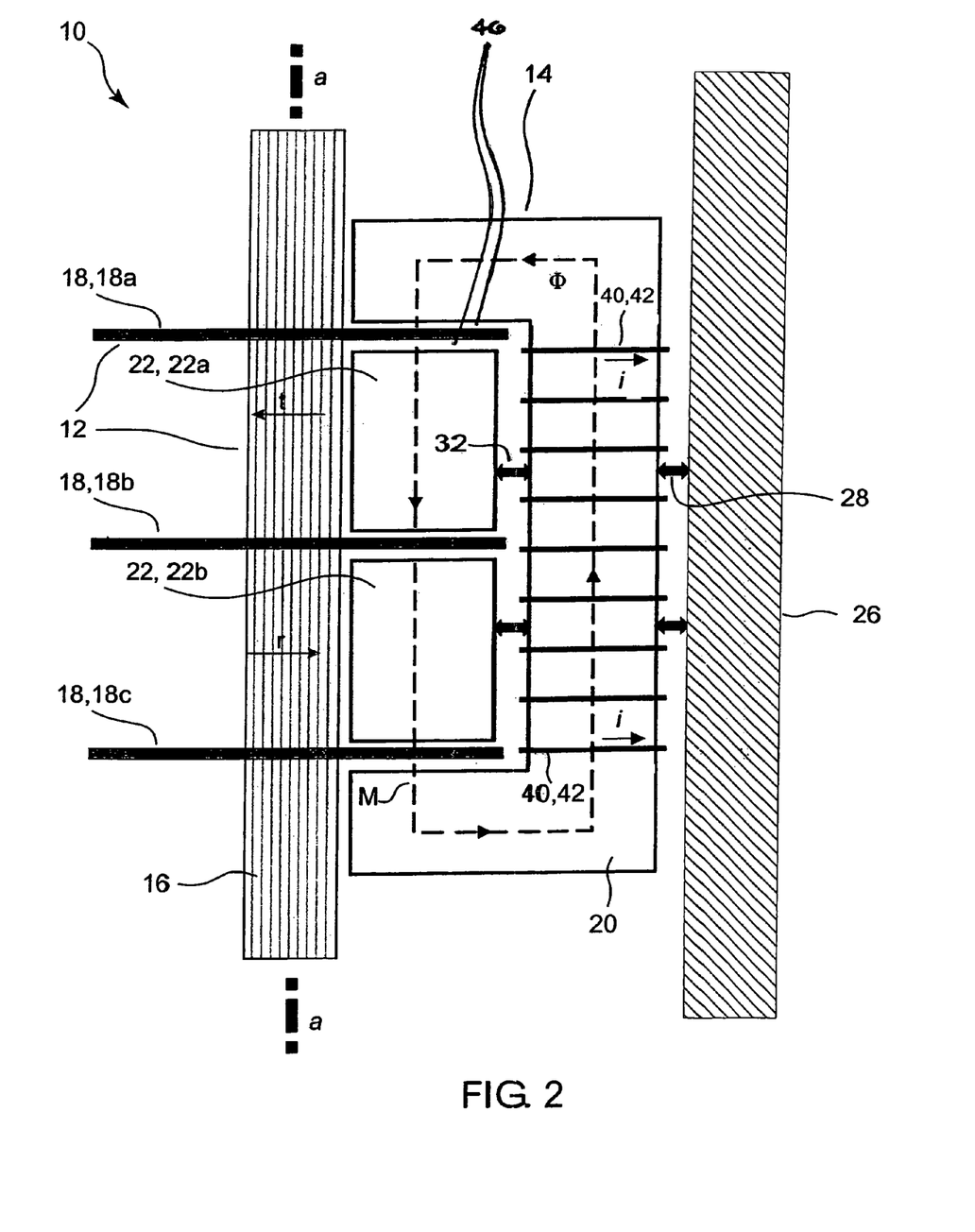
FIG. 2 is a side elevation view of the inventive embodiment shown in FIG. 1. Additionally shown is a symbolically depicted housing/supporting structure for effecting fixed support of the core and guide blocks.

Referring now to FIG. 1 through FIG. 7, inventive device 10 comprises a rotational unit 12 and at least one stationary unit 14. Rotational unit 12 and stationary unit 14 are separately shown in FIG. 5 and FIG. 6, respectively. Rotational unit 12 includes rotational shaft 16 and at least two electrically conductive disks 18. Each stationary unit 14 includes a bracket-shaped electromagnetic core 20 and at least one wedge-shaped guide block 22. For illustrative purposes, only one stationary unit 14 is shown in FIG. 1 and FIG. 2; however, according to more typical inventive practice, inventive device 10 includes plural (e.g., several or many) stationary units 14, circumferentially arranged such as exemplified in FIG. 3 and FIG. 4.

Figure 3:
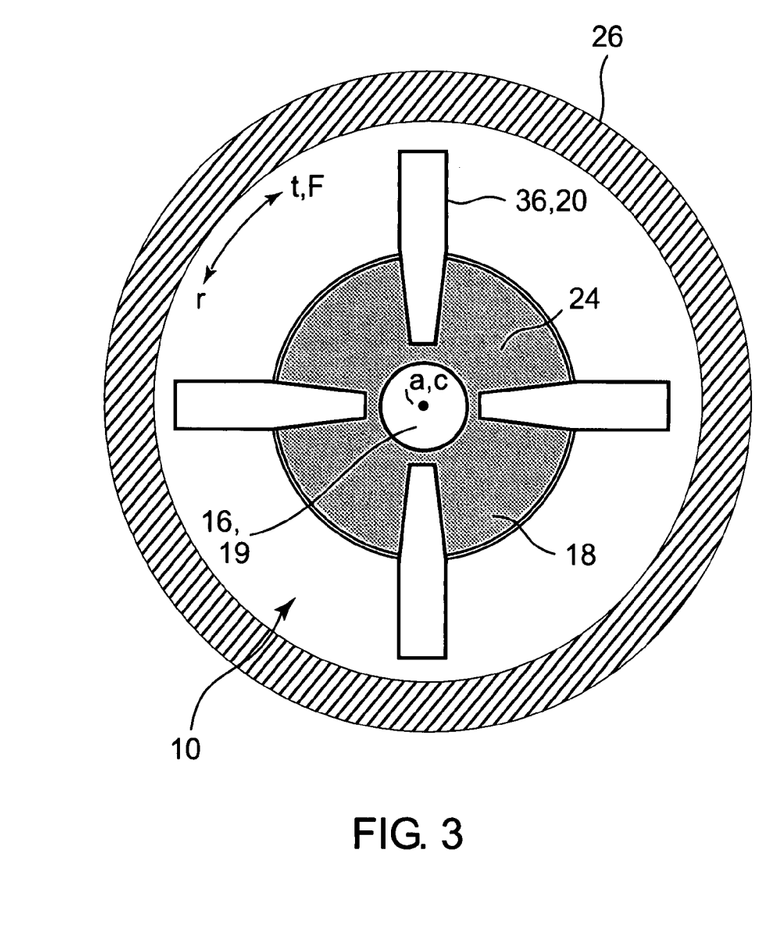
FIG. 3 is a top plan view of the shaft, disks (top disk shown), and core of the inventive device shown in FIG. 1 and FIG. 2. Additionally shown is a symbolically depicted housing/supporting structure, such as shown in FIG. 2.
Figure 4:
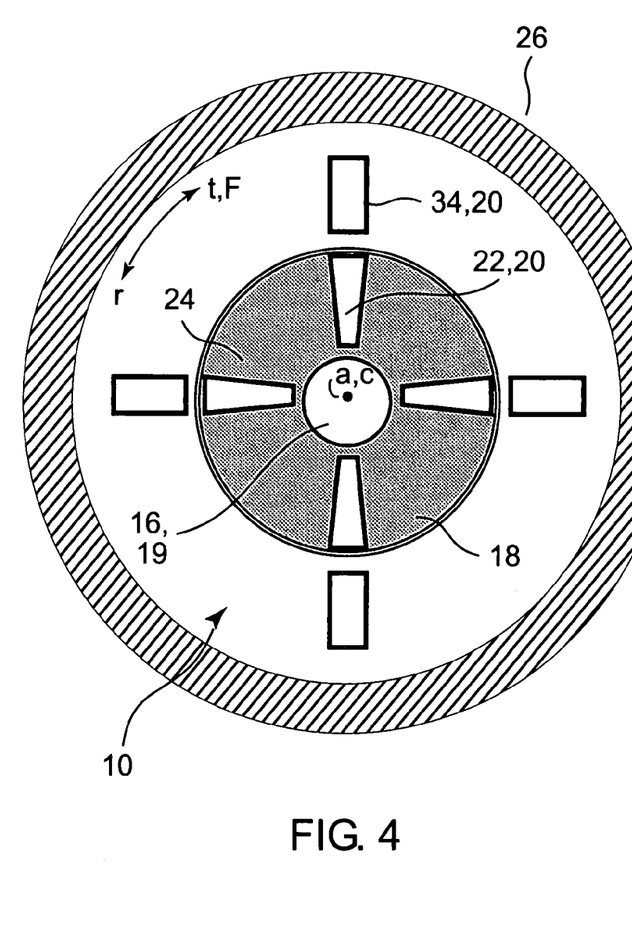
FIG. 4 is a cross-sectional plan view, similar to the view shown in FIG. 3 and sectioned through the shaft and four guide blocks (between a pair of disks), of the shaft, disks (one disk shown), core, and four guide blocks of the inventive device shown in FIG. 1 and FIG. 2. Additionally shown is the symbolically depicted housing/supporting structure shown in FIG. 3.
Figure 7:
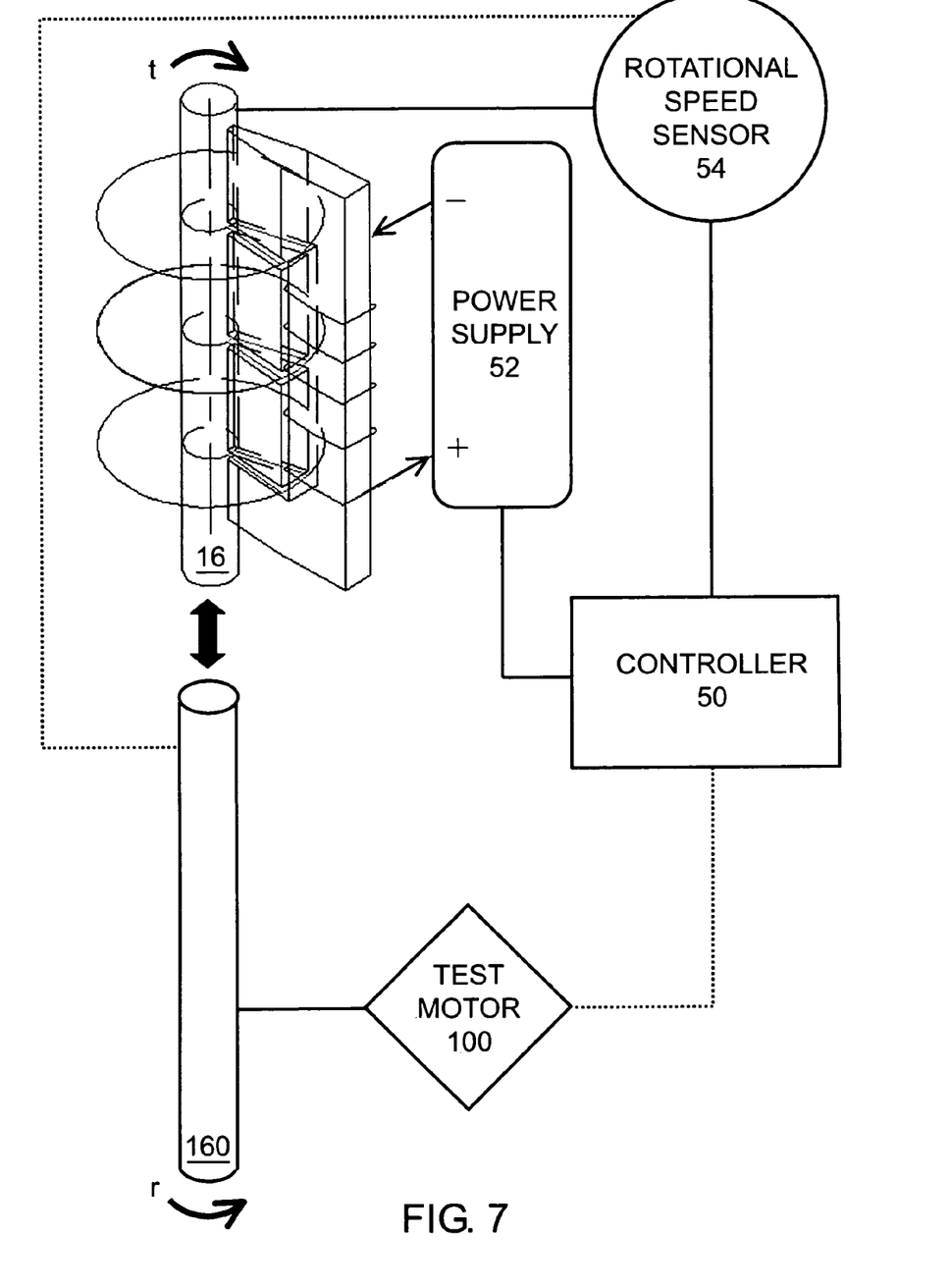
FIG. 7 is a schematic view of an embodiment of a control system, implementing an inventive device such as shown in other figures herein, in accordance with the present invention.

Stationary units 14 are shown in FIG. 3 and FIG. 4 to be arranged at approximately ninety degree angles and to be symmetrical with respect to geometric longitudinal rotational axis a of shaft 16. Inventive practice permits utilization of one or practically any plural number of stationary units 14. In each stationary unit 14, the core 20 and each guide block 22 are constructed of ferromagnetic material such as iron or steel. Each stationary unit 14 extends radially outward from shaft 16, but without being in contact with shaft 16. As shown in FIG. 7, shaft 16 is rigidly connected to, and is driven by, motor shaft 160. Thus connected, the inventive shaft 16 effectively extends, and is rotative along with, the test motor's shaft 160. The inventive device's shaft 16 and the test motor's shaft 160 are axially connected in the direction of rotational axis a, which is shared by both shaft 16 and shaft 160.

Each centrally apertured circular disk 18 is firmly mounted on shaft 16 and rotates in conjunction with shaft 16, which extends through the center hole 19 of disk 18. The respective geometric centers c of the plural disks 18 approximately lie in geometric axis a. Each disk 18 is made of an electrically conductive material such as aluminum or copper. Disks 18 are approximately parallel, approximately congruous, and approximately equally spaced apart from each other. To support high-speed operation, it may be preferred inventive practice to strengthen each disk 18 by means of a high strength band 24 (made, e.g., of steel or Kevlar®) situated on the outer rim of disk 18. Shaft 16 and disks 18 do not contact any non-rotating components. As diagrammatically represented in FIG. 2 through FIG. 4, frame 26 rigidly supports cores 20 using fastening means 28 such as an adhesive (e.g., a polyester or epoxy or similar material having moderate strength and electrical insulating characteristics) or one or more fasteners (e.g., bolts) that are made of plastic, aluminum or another non-magnetic material such as a non-magnetic composite material. The entire inventive device 10 is supported in a rather stiff housing such as frame 26, which firmly maintains the positions of core 20 and guide blocks 22 (via fasteners 32) with respect to disks 18.

Inventive practice usually provides for the implementation of housing/support structure for the stationary electromagnetic elements. In the light of the instant disclosure, multifarious configurations and techniques for housing or supporting the stationary electromagnetic elements will be evident to the ordinarily skilled artisan. For instance, according to many inventive embodiments, a common frame joins all of the electromagnetic elements. As illustrated in FIG. 3 and FIG. 4, rotational unit 12 is characterized by circular symmetry. Stationary units 14 are radially disposed around shaft 16. The circularity of frame 26 affords some compatibility with the circular symmetry of rotational unit 12. It is emphasized that frames 26 and fasteners 28 shown in FIG. 2 through FIG. 4 and FIG. 8 are merely representative, in highly diagrammatic fashion, of the large variety of housing/support systems that the ordinarily skilled artisan who reads the instant disclosure can bring to bear in practicing the present invention.

Notable is the absence of any bearing means for supporting the rotating assembly. The implementation of bearings (such as bearings on shaft 16 that are associated with frame 26) would defeat an important feature of the present invention, namely, the complete lack of physical coupling between the rotor component (which includes main shaft 160 and rotational unit 12) and the stator component (which includes stationary units 14, windings 42 and frame 26). An important principle of the present invention is the application of a torque via the magnetic field in the aether (action at a distance) without the need for any contact forces. The inclusion of any bearing apparatus would create contact forces between the rotor and the stator, thus transferring forces between the rotor and the stator via contact, and possibly also generating forces due to irregular surface shapes. As the present invention is usually practiced, the present invention's intent is that the rotor be supported on the rotating test object, while the stator be placed in the proper proximity to the rotor and carefully aligned but without any physical contact with the rotor.

Figure 6:
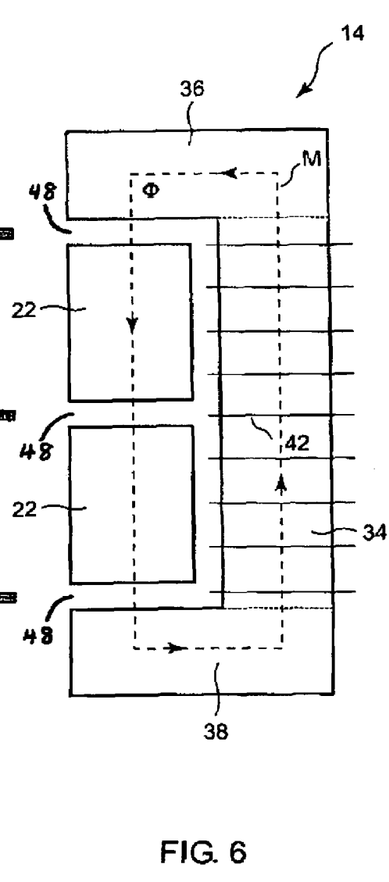
FIG. 6 is a side elevation view, similar to the view shown in FIG. 2, of the core, winding and guide blocks of the inventive device shown in FIG. 1 and FIG. 2, additionally depicting how a core portion and the winding, together, constitute an electromagnet that emanates a magnetic field when current flows through the winding.

Each stationary unit 14 includes one ferromagnetic bracket-shaped core 20 and plural (two shown in FIG. 1, FIG. 2 and FIG. 6), discrete, ferromagnetic, wedge-shaped guide blocks 22. In each stationary unit 14, the combination of a core 20 and plural guide blocks 22 describes a largely solid, substantially rectilinear geometric shape, wherein core 20 mechanically supports guide blocks 22 by non-magnetic means, such as through utilization with respect to each guide block 22 of fastening means 32 comprising either an adhesive material (e.g., a polyester or epoxy material or a similar material having moderate strength and electrical insulating characteristics) or one or more one or more fasteners 32 (e.g., one or more brackets attached to core 20) that are made of plastic, aluminum or another non-magnetic material such as a non-magnetic composite material. The term "fastening means" is broadly used herein to refer to any means that can be used for attaching, joining, affixing, fastening, connecting or holding together two or more objects, including but not limited to any one of or any combination of devices such as nail, screw, bolt, nut, washer, clamp, clasp, clip, bracket, peg, pin, staple, rivet, hook, tie, weld, adhesive, etc. As illustrated in FIG. 6, bracket-shaped core 20 is conceptually divisible into three generally straight sections, viz., a back (longitudinal) core section 34 (which defines an axis of symmetry that is parallel to axis a), a top end core section 36 (which defines an axis of symmetry that is perpendicular to axis a), and a bottom end core section 38 (which defines an axis of symmetry that is perpendicular to axis a).

Blocks 22 are styled herein "guide" blocks because they serve as magnetic flux guides. That is, blocks 22 afford guidance with respect to the path of magnetic flux $\Phi$ in the context of magnetic circuit M, which represents the completely closed (circuitous) magnetic flux $\Phi$ path. According to frequent inventive practice, each guide block 22 is characterized by a wedge shape, having a trapezoidal (nearly triangular) cross-sectional profile, to spatially facilitate the radial distribution of guide blocks 22 about axis a. When two or more guide blocks 22 are associated with a core 20, it is typical inventive practice that the guide blocks 22 represent congruous segments that are aligned end-to-end so as to describe a combined geometric form having the same trapezoidal cross-sectional profile. Each core 20 has associated therewith an electrically conductive wire 40 through which flows a current i. Wire 40 includes a winding portion 42 in which wire 40 is wound or coiled, circumferentially, on back section 34 of core 20.

When a current flow i is applied to core 20 via wire 40 in the manner and direction shown in FIG. 1, FIG. 2 and FIG. 7, an upward magnetic flux $\Phi$ is generated in back section 34 of such core 20. As shown in FIG. 6, the back core section 34 and the coiled wire portion 42 together represent an electromagnet that generates a magnetic flux $\Phi$. Magnetic flux $\Phi$ is then guided (leftward as shown) through top section 36 of core 20, toward shaft 16. Magnetic flux $\Phi$ then leaves top section 36 of core 20 in a downward direction, passing through the first disk 18, viz., top disk 18a. Magnetic flux $\Phi$ is then guided down further through the upper guide block 22a until it reaches the next (second) disk 18, viz., middle disk 18b. Magnetic flux $\Phi$ then passes downward through middle disk 18b, and then continues downward to and through the next guide block 22, viz., lower guide block 22b. Magnetic flux $\Phi$ then reaches and passes through the next (third) disk 18, viz., bottom disk 18c. Magnetic flux $\Phi$ is then guided (rightward as shown) through bottom section 38 of core 20 and toward back section 34 of core 16, whereupon magnetic flux $\Phi$ reaches and proceeds upward through back section 34 of core 16, thereby closing the magnetic flux $\Phi$ path so as to form a magnetic circuit M. Application of current i to winding 42 causes magnetic flux $\Phi$ to return to core 20 from bottom disk 14c and turn rightward and then upward, thereby effecting closure of the path of magnetic flux $\Phi$. Current i is applied continuously during the time that inventive device 10 is in operation. Steady magnetic flux $\Phi$ exists as long as steady current i is flowing in winding 42. The description in this paragraph disregards all "fringing" magnetic flux $\Phi$ as being negligible.

Magnetic flux $\Phi$ passes through each disk 18 in a corresponding region 44. The region 44 where magnetic flux $\Phi$ passes through each disk 18 is indicated in FIG. 1 via a solid outline. The total surface area of regions 44 (which is the sum of the individual surfaces areas of regions 44) increases in accordance with the number of cores 20 that the inventive device 10 includes. That is, the more cores 20 that are utilized, the greater is the overall surface area of each disk 18 through which magnetic flux $\Phi$ passes. In each disk 18, eddy currents e are created at the corresponding region 44, the location of through-passage of magnetic flux $\Phi$. Eddy currents e occur in each disk 18 as a consequence of the rotation of disk 18 in synchronism with the intersection thereof of magnetic flux $\Phi$. The interaction of the eddy currents e with the magnetic field causes a Lorentz force F. Because of the geometrical configuration of the inventive system, this Lorentz force F is manifested as a torque t developed on the disk 18 in a direction such as to oppose the rotation r of shaft 16. Torque t will oppose (be counter-rotational with respect to) shaft rotation r regardless of whether shaft rotation r is clockwise or counterclockwise. With some approximation, torque t will be directly proportional to the rotational speed (i.e., the speed of rotation r) of shaft 16. No torque t whatsoever will be produced when shaft 16 is at a standstill, or in other words when the rotational speed equals zero. For this reason, inventive practice will generally not be useful for determining the ability of the motor 100 to start under load.

If the current i in the portion 42 windings of wire 40 is held constant, the load torque t applied to shaft 16 will rise with the rotational speed of shaft 16. In some applications, the inventive practitioner may desire that torque t be maintained at a constant value while passing from a first non-zero rotational speed of shaft 16 to a second, higher rotational speed of shaft 16. Holding torque t constant requires that the current i in the portion 42 wire windings be appropriately decreased as the rotational speed of shaft 16 increases. If the inventive system is operating at one load level, and it is desired to increase the load to a higher level at the same rotational speed, the current i in the portion 42 wire windings must be increased. The limiting loading rate is largely controlled by the voltage rating of power supply 52 (shown in FIG. 7) and by the inductance (and resistance) of the portion 42 wire windings.

The operation of inventive device 10 is somewhat similar in principle to that of the magnetic motion damper (also referred to simply as a "magnetic damper") that is found in some scientific balances and similar apparatus. In accordance with previously known applications of the "magnetic damper" type, the magnetic field is constant and, usually, is supplied by a permanent magnet. In contrast, in accordance with typical embodiments of the present invention, the magnetic field B is specifically supplied by an electromagnet, and the current i in the electromagnet is controlled in order to achieve control over the developed torque t.

As schematically illustrated in FIG. 7, test motor shaft 160 is included in or associated with test motor 100. Controller 50 is electrically connected to power supply 52 (e.g., a battery or other device providing direct current) and rotational speed sensor 54. The rotational speed of motor shaft 160 (and hence of inventive shaft 16) can be controlled either through existing mechanism included in or associated with test motor 100, or through controller 50 so as to be dedicated to control of the entire load testing procedure. Inventive shaft 16 and motor shaft 160 are fixedly structurally connected in the direction of rotational axis a, and rotate together as an integral unitary shaft. Inventive practice will normally necessitate utilization of a rotational speed sensor 54 for sensing the rotational speed of motor shaft 160 (and hence of inventive shaft 16). Rotational speed sensor 54, electrically connected to inventive shaft 16 or motor shaft 160, communicates with controller 50 in order that controller 50 can set a current i to produce a given torque t. As the rotational speed changes, the current i will, in most cases, need to be continuously adjusted to produce the required torque-time characteristics.

As shown in FIG. 2 and FIG. 6, each space between two guide blocks 22, or between a guide block 22 and a core end section 36 or 38, represents a slot 48 that accommodates a disk 18 so as to leave two air-gaps 46. In order to minimize the required magnetomotive force (mmf), it is preferable to minimize the air-gaps 46. By "air-gap" is meant herein a space between a guide block 22 and the non-contactingly abutting surface of an adjacent disk 18, or a space between a core end section 36 or 38 and the non-contactingly abutting surface of an adjacent disk 18. In order to minimize the reluctance of the magnetic circuit M, and therefore the associated magnetomotive force (mmf) and hence current i, inventive practice frequently prefers a shortening of the magnetic circuit M insofar as is reasonably possible. Such reduction or minimization of the length of magnetic circuit M can be achieved by doing one or more of the following to the extent that it is suitably practicable: spacing disks 18 closer together on shaft 16; decreasing the length (in the direction of axis a) of guide blocks 22; decreasing the clearance (width) of air-gaps 46; increasing the cross-sectional area of main core section 34 of core 16; increasing the cross-sectional area of end core sections 36 and 38 of core 16; increasing the cross-sectional area (i.e., the mathematical area of region 44) of guide blocks 22; increasing the number of turns of wire 40 in winding portion 42 (provided that there is room to do so).

It may be useful in inventive practice—particularly in situations in which an inventive device is being custom designed to be built for a specific test—to perform lateral vibration analyses on the rotor and on the complete system after the inventive design is considered completed. In the absence of a forced vibration analysis, all that can be done in this regard is to extract the natural frequencies and assure that there are none in the intended operating range. If there is significant lateral vibration, this can tilt disks 18 out of plane, causing closure of air-gaps 46 and concomitant metal-to-metal contact between disks 18 and guidance blocks 22 (and/or between disks 18 and upper and lower core end sections 36 and 38). This type of failure is unacceptable and generally demands that the inventive system be designed anew. The present invention can thus be practiced in the manner of designing an inventive device to suit a specific test machine or purpose. The present invention can also be practiced in the manner of providing an inventive device to suit various test machines and purposes. For instance, many inventive device embodiments can be associated with whatever machine needs to be tested; generally, in such cases, the inventive practitioner accepts the rotor dynamics that exist for any such combination of inventive device and test machine.

Figure 5:
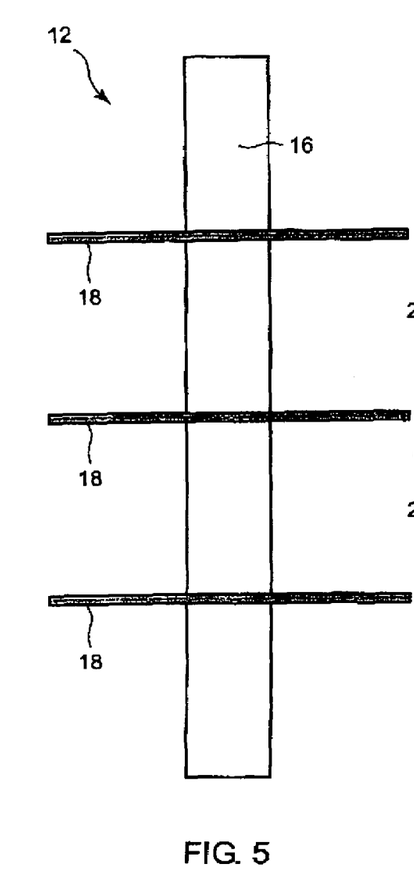
FIG. 5 is an elevation view, similar to the view shown in FIG. 2, of the shaft and disks of the inventive device shown in FIG. 1 and FIG. 2.
Figure 8:
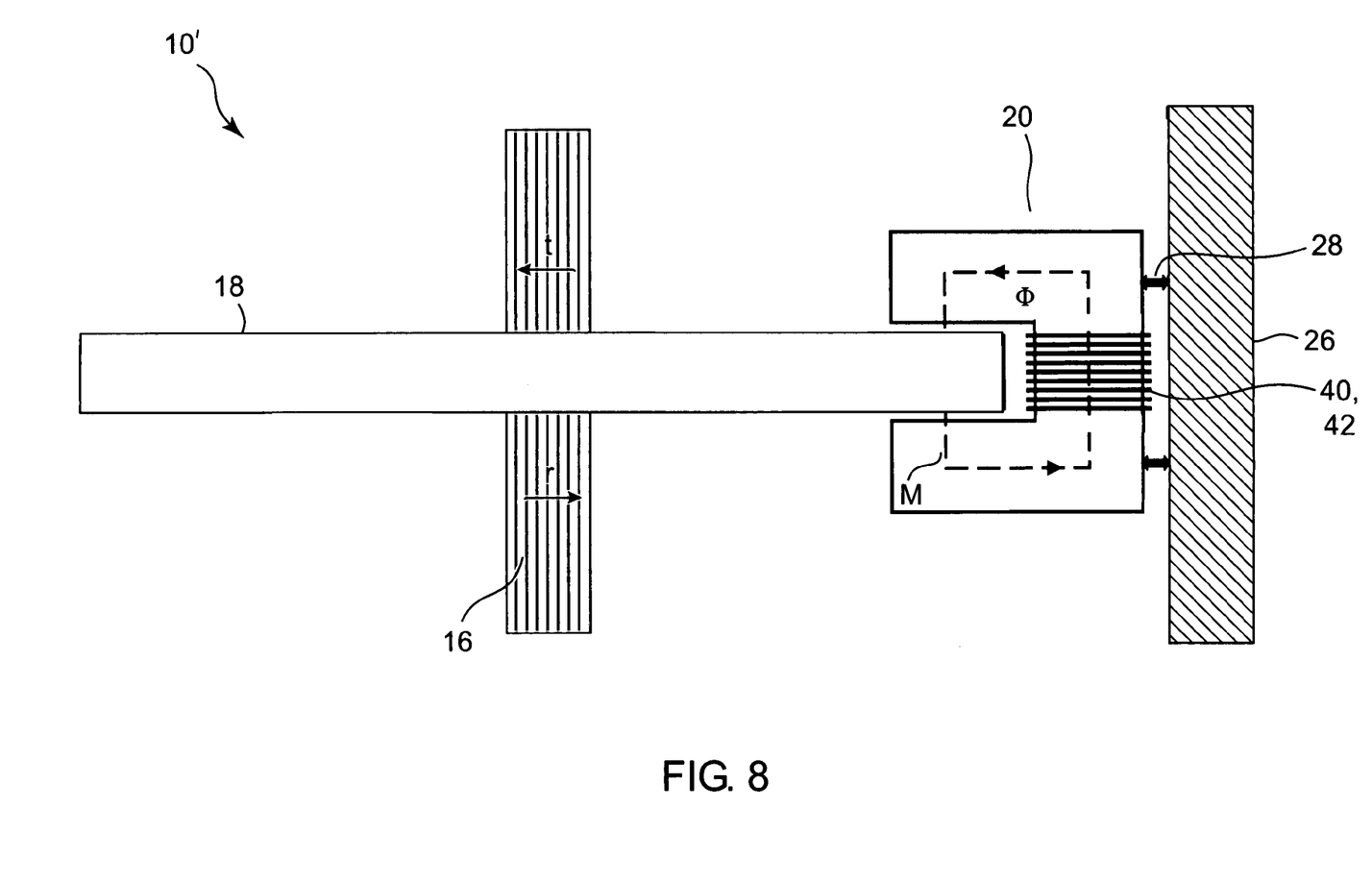
FIG. 8 is a side elevation view, similar to the view shown in FIG. 2, of another embodiment of a torque load imposition device in accordance with the present invention, wherein the inventive device includes only one disk. Additionally shown is a symbolically depicted housing/supporting structure for effecting fixed support of the magnetic core.

Reference is now made to FIG. 8, which is illustrative of inventive embodiments that involve implementation of a single electrically conductive disk 18, and that hence obviate implementation of any guide blocks 22. Although three disks 18 are shown in FIG. 1, FIG. 2 and FIG. 5, it is to be understood that an inventive device 10 can be embodied to include a single disk 18 or any plural number of disks 18. Inventive device 10' shown in FIG. 8 includes a single disk 18; nevertheless, the inclusion of at least two disks 18 represents generally much preferred inventive practice. The inventive single-disk configuration shown in FIG. 8, while possible in accordance with inventive principles, will usually be highly impractical insofar as it will require enormous current in the windings 40 to develop sufficient torque t, unless the rotor (motor shaft 160, and hence inventive shaft 16) is operating at a very high speed. Note that similar inventive principles obtain for inventive device 10' in that a magnetic field B (oriented generally parallel to the length of back core section 34) is associated with the combination of circumferential winding portion 42 and back core section 34, and in that magnetic circuit of flux $\Phi$ is created through the combination of core 20 and one disk 18 (as distinguished from typical inventive embodiments involving implementation of plural disks 18, wherein a magnetic circuit of flux $\Phi$ is created through the combination of core 20, at least two disks 18, and at least one guide block 22).

In the light of the instant disclosure, the ordinarily skilled artisan will be capable of practicing the present invention with desired effect by selectively varying among parameters including the following: (i) diameter of shaft 16; (ii) length of shaft 16; (iii) number of disks 18; (iv) material of disk 18; (v) diameter of disk 18; thickness of disk 18; (vi) geometrical shape of core 20; (vii) number of turns of wire 40 on each winding portion 42; number of cores 20 (with a winding portion 42 on each core 20); operating current i; geometrical shape of each guide block 22; "air-gap" widths or clearances within contiguous pairs of guide blocks 22 and disks 18;

"air-gap" widths or clearances within contiguous pairs of core end sections (36 or 38) and disks 18. These and other factors are available to the inventive practitioner for adjustment, as needed, to satisfy particular design requirements. Another consideration is that it may become necessary in inventive practice to water-cool disks 18; however, water-cooling of disks 18 is to be avoided if at all possible, as it would tend to complicate inventive practice. The desirability of avoiding such water-cooling would tend to militate in favor of a greater number of disks 20 sharing a reduced magnetic field that requires less winding current and therefore has less Ohmic losses.

According to one approach to fabricating an inventive device's stationary unit 14, a coil 42 is wound around a core member 20, and the combination thereof is vacuum impregnated in epoxy. Next, the guide members 22 are positioned relative to the wound core member 20, and epoxy is applied to hold the guide members 22 in place. Then, the entire inventive stationary unit 14 assembly is dipped in epoxy. Subsequently, epoxy can be used for adhering or affixing the inventive stationary unit 14 assembly with respect to a housing/support structure 26. In the light of the instant disclosure, the ordinarily skilled artisan will appreciate the various methods and techniques for making a test device 10 in accordance with the present invention.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A device for exerting counter-rotational influence on a rotor, said device comprising a rotational component and plural stationary components, said rotational component including plural electrically conductive wheels and an axle for being coaxially fastened to said rotor, said wheels being perpendicular to said axle and parallel to and separated from each other, each said wheel being coaxially fastened to said axle, each said stationary component including a ferromagnetic core structure and at least one ferromagnetic guidance structure, said core structure being characterized by a bracket shape and including a main core section and two projective core sections, said at least one guidance structure being fastened to said core structure so that said core structure and said at least one guidance structure together describe a generally prismatic shape having plural slots each accommodative of said wheel, each said slot being formed by the interface between two said guidance structures or by the interface between said guidance structure and said projective core section, said device being capable of engendering Lorentz forces that oppose the rotation of said rotor, said device being capable of engendering said Lorentz forces when used in a manner including the following:
   said axle is coaxially fastened to said rotor;
   each said stationary component is situated so that said main core section is parallel to said axle and so that said wheels are partially inside said slots;
   rotation of said rotor is activated whereby said axle and said wheels rotate together with said rotor;
   electrical current is caused to flow through electrically conductive wiring that is partially coiled around said core structure of each said stationary component;
   in each said stationary component, a closed magnetic flux path is generated through said core structure, said at least one guidance structure, and said rotating wheels;
   in each said wheel, electrical eddy currents are generated in association with the rotation of said wheel and the intersection of said wheel by said closed magnetic flux path of each said stationary component;
   in each said stationary component, a magnetic field is generated in association with the flowing of said electrical current through said wire partially coiled around said core structure;
   said Lorentz forces are generated in association with the interactions between said magnetic fields and said electrical eddy currents.

2. The device of claim 1, wherein said device further comprises said electrically conductive wiring.

3. The device of claim 2, wherein said device further comprises a power supply for providing direct said electrical current for said electrically conductive wiring.

4. The device of claim 3, wherein said device further comprises:
   sensing means for sensing the speed at which said rotor rotates; and
   control means, communicating with said sensing means and said power supply, for controlling the amount of the direct said electrical current that said power supply is providing.

5. An apparatus for affecting the rotation of a mechanical shaft, said apparatus comprising:
   a rotatable assembly including a rigid adjunctive shaft and at least two electrically conductive disks, said adjunctive shaft being characterized by a geometric rotational adjunctive axis, said disks being separated from and parallel to each other, each said disk having a rim, being perpendicular to said adjunctive shaft, and being concentrically and fixedly attached to said adjunctive shaft so as to be rotatable commensurately with said adjunctive shaft, said disks including two longitudinally extreme said disks having respective outward faces; and
   at least two stationary electromagnetic structures, each said stationary electromagnetic structure including a bracket-shaped core member and at least one guidance member, said core member including a linear main core section and a pair of linear protrusive core sections at opposite ends of and perpendicular to said main core section, each said guidance member being fixedly attached to said main core section;
   wherein said apparatus is capable of association with a machine that includes a rigid machine shaft characterized by a geometric rotational machine axis, wherein according to said association: said adjunctive shaft is coaxially and fixedly attached to said machine shaft so as to be rotatable commensurately with said machine shaft, said adjunctive axis and said machine axis being collinear; said stationary electromagnetic structures are positioned generally surroundingly with respect to said rotatable assembly, said stationary electromagnetic structures being at least substantially symmetrical with respect to said adjunctive axis; each said main core section is parallel to said adjunctive axis, perpendicular to said disks, and situated near the respective said rims; each said protrusive core section is perpendicular to and radially disposed with respect to said adjunctive axis, parallel to said disks, and situated next to said outward face; each said guidance member is closely interposed between two adjacent said disks and is radially disposed with respect to said adjunctive axis so that said guidance member thickness increases in a direction away from said adjunctive axis; an electrical winding is wound about said main core section of each said stationary electromagnetic structure;

wherein, upon rotation of said machine shaft and electrification of said electrical winding of each said stationary electromagnetic structure, a counter-rotational effect results as follows: a closed magnetic flux path is generated through each said stationary electromagnetic structure whereby said magnetic flux flows in a closed loop through the corresponding said bracket-shaped core member, the corresponding said at least one guidance member, and the rotating said disks; electrical eddy currents are generated in said disks, said electrical eddy currents resulting from the rotation of said disks in combination with the intersection of said disks by each said closed magnetic flux path; at least two magnetic fields are generated, each said magnetic field emanating from the combination of said electrical winding and said main core section about which said electrical winding is wound; Lorentz forces are generated in association with the physical interaction of said electrical eddy currents and said at least two magnetic fields; said adjunctive shaft, and hence said machine shaft, develops a resistive torque load in accordance with the generation of said Lorentz forces.

6. The apparatus defined in claim 5, said apparatus further comprising a housing for securing said at least two stationary electromagnetic structures.

7. The apparatus defined in claim 5, said apparatus further comprising:
a power supply for supplying electrical current for said electrification;
a rotational speed sensor for sensing the rotational speed of said machine shaft; and
a controller for receiving information from said rotational speed sensor and for selecting, based on said received information, an amount of said electrical current for conduction by said electrical winding.

8. The apparatus defined in claim 7, said apparatus further comprising a housing for securing said at least two stationary electromagnetic structures.

9. The apparatus defined in claim 5, wherein each said guidance member is a wedge-shaped guidance member characterized by a guidance member thickness, and is fixedly attached to said main core section so that said guidance member thickness decreases in a direction away from said main core section.

10. The apparatus defined in claim 5 wherein the number of said at least one guidance member that each said stationary electromagnetic structure includes is one less than the number of said disks.

11. A method for exerting counter-rotational influence on a rotor, said method comprising:
providing a device including a rotational component and plural stationary components, said rotational component including plural electrically conductive wheels and an axle for being coaxially fastened to said rotor, said wheels being perpendicular to said axle and parallel to and separated from each other, each said wheel being coaxially fastened to said axle, each said stationary component including a ferromagnetic core structure and at least one ferromagnetic guidance structure, said core structure being characterized by a bracket shape and including a main core section and two projective core sections, said at least one guidance structure being fastened to said core structure so that said core structure and said at least one guidance structure together describe a generally prismatic shape having plural slots each accommodative of said wheel, each said slot being formed by the interface between two said guidance structures or by the interface between said guidance structure and said projective core section;
coaxially fastening said axle to said rotor;
situating each said stationary component so that said main core section is parallel to said axle and so that said wheels are partially inside said slots;
activating rotation of said rotor whereby said axle and said wheels rotate together with said rotor;
partially coiling electrically conductive wiring around said core structure of each said stationary component; and
causing electrical current to flow through said electrically conductive wiring;
wherein physical events occur including the following: in each said stationary component, a closed magnetic flux path is generated through said core structure, said at least one guidance structure, and said rotating wheels; in each said wheel, electrical eddy currents are generated in association with the rotation of said wheel and the intersection of said wheel by said closed magnetic flux path of each said stationary component; in each said stationary component, a magnetic field is generated in association with the flowing of said electrical current through said wire partially coiled around said core structure; Lorentz forces are generated in association with the interactions between said magnetic fields and said electrical eddy currents, said Lorentz forces opposing the rotation of said rotor.

12. The method according to claim 11, wherein said method further comprises sensing the speed at which said rotor rotates, and wherein said causing of electrical current to flow includes selectively causing electrical current to flow based on said speed.

\* \* \* \* \*